(12) United States Patent
Marupaduga

(10) Patent No.: US 11,115,860 B1
(45) Date of Patent: Sep. 7, 2021

(54) SECONDARY ACCESS NODE CONTROL IN A WIRELESS COMMUNICATION NETWORK

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/824,360

(22) Filed: Mar. 19, 2020

(51) Int. Cl.
*H04W 4/00* (2018.01)
*H04W 28/04* (2009.01)
*H04W 24/10* (2009.01)

(52) U.S. Cl.
CPC ........... *H04W 28/04* (2013.01); *H04W 24/10* (2013.01)

(58) Field of Classification Search
USPC .................. 455/450; 370/331, 330, 329, 328
See application file for complete search history.

(56) References Cited

U.S. PATENT DOCUMENTS

| | | | |
|---|---|---|---|
| 8,254,943 B1* | 8/2012 | Dinan ................... | H04W 24/04 455/450 |
| 9,629,158 B2 | 4/2017 | Yu et al. | |
| 9,681,344 B1* | 6/2017 | Oroskar .............. | H04W 36/023 |
| 10,251,145 B2 | 4/2019 | Catovic et al. | |
| 2012/0026940 A1 | 2/2012 | Barbieri et al. | |
| 2012/0087338 A1* | 4/2012 | Brandt .............. | H04W 36/0011 370/331 |
| 2016/0205693 A1* | 7/2016 | Lu .......................... | H04W 48/18 370/329 |
| 2017/0078935 A1* | 3/2017 | Hahn ................. | H04W 36/0094 |
| 2017/0311208 A1* | 10/2017 | Yu ...................... | H04W 36/0058 |
| 2017/0318508 A1* | 11/2017 | Berglund .......... | H04W 36/0072 |
| 2018/0124677 A1* | 5/2018 | He ...................... | H04W 72/085 |
| 2019/0069205 A1 | 2/2019 | Lee et al. | |
| 2019/0069325 A1 | 2/2019 | Yerramalli et al. | |
| 2020/0045563 A1 | 2/2020 | Luo et al. | |
| 2020/0053602 A1 | 2/2020 | Kadiri et al. | |
| 2021/0126726 A1* | 4/2021 | Parkvall ................ | H04L 5/1469 |

FOREIGN PATENT DOCUMENTS

| | | |
|---|---|---|
| WO | 2019227107 A1 | 11/2019 |
| WO | 2020033210 A1 | 2/2020 |

* cited by examiner

*Primary Examiner* — David Q Nguyen

(57) ABSTRACT

In a wireless communication network, a primary access node controls the amount of secondary access nodes that serve User Equipment (UE). The primary access node exchanges data with the UE, corrects errors, and determines an error rate. The primary access node exchanges the data over backhaul links and determines backhaul throughput. The primary access node determines a target number of the secondary access nodes based on the error rate and the backhaul throughput. The primary access node identifies a qualifying set of the secondary access nodes that have adequate received signal strength. The primary access node selects a serving set having the target number of secondary access nodes from the qualifying set. The primary access node indicates the UE to the serving set and indicates the serving set to the UE. The serving set of the secondary access nodes exchange data with the UE.

20 Claims, 8 Drawing Sheets

SECONDARY ACCESS NODE CONTROL IN A WIRELESS COMMUNICATION NETWORK

TECHNICAL BACKGROUND

Wireless communication networks provide wireless data services to wireless user devices. The wireless data services include internet-access, media-streaming, machine communications, and the like. Exemplary wireless user devices comprise phones, computers, wearable transceivers, vehicles, robots, and sensors. The wireless communication networks have wireless access nodes that exchange wireless signals with the wireless user devices over radio frequencies using wireless network protocols. Exemplary wireless network protocols include Long Term Evolution (LTE) and Fifth Generation New Radio (5GNR).

In some examples, multiple wireless access nodes serve the same wireless user device at the same time. For example, a wireless user device may communicate with an LTE eNodeB and a 5GNR gNodeB at the same time. One of the wireless access nodes is a primary access node that controls the other secondary access nodes. The primary access node selects the secondary access nodes to serve the UE, and the primary access node signals the secondary access nodes to serve the UE. The secondary access nodes wirelessly exchange data with the UE to deliver the wireless data services.

The wireless access nodes and wireless user devices perform error correction on their data exchanges. The error correction entails the wireless retransmission of lost or corrupt data. The wireless access nodes determine error rates for the error correction. The error rate comprises a ratio of the amount of retransmitted and lost data to the total amount of transmitted data. The wireless access nodes also determine backhaul throughput for the data exchanges. The backhaul throughput comprises a bit rate or similar metric for the backhaul links between the wireless access nodes and other network elements in the wireless communication network. Unfortunately, the wireless access nodes do not use the error rates and backhaul throughput to efficiently and effectively optimize the amount of secondary access nodes that serve the wireless user devices.

Technical Overview

In a wireless communication network, a primary access node controls the amount of secondary access nodes that serve User Equipment (UE). The primary access node exchanges data with the UE, corrects errors, and determines an error rate. The primary access node exchanges the data over backhaul links and determines backhaul throughput. The primary access node determines a target number of the secondary access nodes based on the error rate and the backhaul throughput. The primary access node identifies a qualifying set of the secondary access nodes that have adequate received signal strength. The primary access node selects a serving set having the target number of secondary access nodes from the qualifying set. The primary access node indicates the UE to the serving set. The primary access node indicates the serving set to the wireless UE. The serving set of the secondary access nodes then exchange data with the wireless UE.

DETAILED DESCRIPTION

Figure 1:
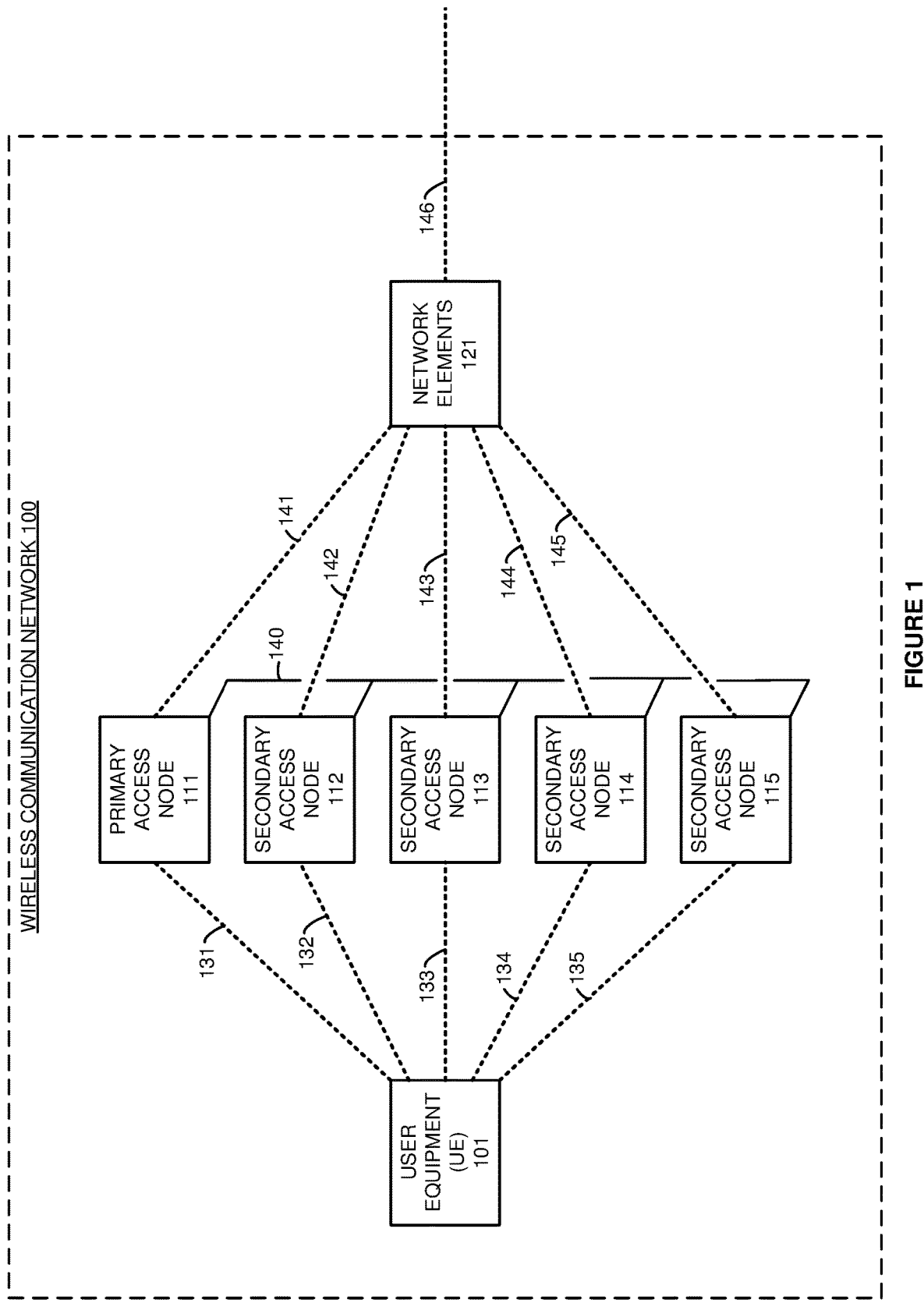
FIG. 1 illustrates a wireless communication network comprising a primary access node that controls the amount of secondary access nodes that serve a wireless User Equipment (UE).

FIG. 1 illustrates wireless communication network 100 comprising primary access node 111 that controls the amount of secondary access nodes 112-115 that serve wireless User Equipment (UE) 101. Wireless communication network 100 supports wireless data services like internet-access, media-streaming, messaging, machine-control, machine-communications, and/or some other wireless data product. Wireless communication network 100 comprises UE 101, access nodes 111-115, and network elements 121. UE 101 and access nodes 111-115 communicate over wireless links 131-135. Primary access node 111 and secondary access nodes communicate over signaling links 140. Access nodes 111-115 and network elements 121 communicate over backhaul links 141-145. Network elements 121 communicate with other data systems over network links 146.

Wireless links 111-115 use frequencies in the low-band, mid-band, high-band, or some other part or the wireless electromagnetic spectrum. Wireless links 111-115 use wireless protocols like Fifth Generation New Radio, (5GNR), Long Term Evolution (LTE), Low-Power Wide Area Network (LP-WAN), Institute of Electrical and Electronic Engineers (IEEE) 802.11 (WIFI), and/or some other networking technology. Links 140-146 use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, and/or some other networking protocols.

Access nodes 111-115 comprise radios and Baseband Units (BBUs) that are coupled over data links. The radios include antennas, filters, amplifiers, analog-to-digital interfaces, microprocessors, memory, software, transceivers, bus circuitry, and the like. The BBUs include microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, radio applications, and network applications. The microprocessors read the software from the memories and execute the software to direct wireless communications with UE 101 and to direct backhaul communications with network elements 121.

UE 101 could be a phone, computer, vehicle, or some other apparatus with wireless communication circuitry. UE 101 comprises radios and user circuitry. The radios comprise antennas, filters, amplifiers, analog-to-digital interfaces, microprocessors, memory, software, transceivers, bus circuitry, and the like. The user circuitry comprises user interfaces, microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like operating systems, user applications, network applications, and radio applications. The microprocessors read the software from the memories and execute the software to direct wireless communications with access nodes 111-115 and to direct user communications through the user interfaces with machines, animals, and/or humans.

Network elements 121 could be access nodes, gateways, routers, servers, access managers, databases, firewalls, and/or the like. Network elements 121 comprise microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like network functions and databases. The microprocessors read the software from the memories and execute the software to direct the network communications with access nodes 111-115 and to direct external communications over network links 146.

UE 101 and primary access node 111 exchange data over wireless links 131. Primary access node 111 and network elements 121 exchange at least some of the data over backhaul links 141. Network elements 121 exchange some of the data over network links 146. Primary access node 111 determines backhaul throughput for backhaul links 141. The backhaul throughput is typically measured in average bytes per second and may be determined separately for the downlinks and the uplinks in backhaul links 141.

Primary access node 111 performs error correction on the data. The error correction entails the retransmission of lost or corrupted data. Primary access node 111 then determines error rates for the error correction. The error rate is a ratio of the amount of lost/retransmitted data to the total amount of transmitted data. UE and primary access node 111 may use various error corrections techniques. In some examples, UE and primary access node 111 use Hybrid Automatic Repeat Request (HARQ), and the error rate comprises HARQ Block Error Rate (BLER). On the uplinks, primary access node 111 may check parity bits for accuracy and acknowledge the accurately-received data to UE 101. On the uplinks, primary access node 111 may check sequence numbers for order and request the retransmission of missing data from UE 101. On the downlinks, primary access node 111 may add parity bits and retransmit data that is not acknowledged to UE 101. On the downlinks, primary access node 111 may add sequence numbers and retransmit missing data upon request from UE 101. In some cases, UE 101 and primary access node 111 may not retransmit small amounts of lost data, although other layers like Transmission Control Protocol (TCP) may perform the retransmissions over primary access node 111.

Primary access node 111 determines a target number of secondary access nodes 112-115 to serve UE 101 based on the error rate for UE 101 and the backhaul throughput for backhaul links 141. For example, primary access node 111 may host a data structure that is entered with metrics for the error rate and the backhaul throughput to yield a target number of secondary access nodes. Over time, primary access node 111 increases the target number responsive to error rate decreases and backhaul throughput increases. Over time, primary access node 111 decreases the target number responsive to error rate decreases and backhaul throughput increases. In some scenarios, primary access node 111 combines multiple increases and decreases that are responsive to different error rate and backhaul throughput changes to determine the target number. For example, a default target number of two may be raised to four based on a low error rate and then be lowered back to three due to a low backhaul throughput.

Primary access node 111 identifies a qualifying set of secondary access nodes 112-115 that have adequate received signal strength at UE 101. In some examples, UE 101 reports the received signal strengths of access nodes 112-115 to primary access node 111. The reported secondary access nodes are referred to the candidate set. In these examples, primary access node 111 wirelessly receives a report from UE 101 that indicate a candidate set of secondary access nodes 112-115 and their individual received signal strengths at UE 101. Primary access node 111 selects a qualifying set of secondary access nodes 112-115 from the candidate set based on the individual received signal strengths. For example, primary access node 111 may select the qualifying set based on which received signal strengths exceed a qualifying threshold.

From the qualifying set of secondary access nodes 112-115, primary access node 111 selects a serving set having the target number of secondary access nodes 112-115. Primary access node 111 transfers signaling to the serving set of secondary access nodes 112-115 that indicates UE 101. Primary access node 111 transfers signaling to UE 101 that indicates the serving set of secondary access nodes 112-115. UE 101 and the serving set of secondary access nodes 112-115 exchange data over corresponding wireless links 131-135. The serving set of secondary access nodes 112-115 and network elements 121 exchange the data over corresponding ones of backhaul links 141-145. Network elements 121 exchange some of the data over network links 146.

Figure 2:
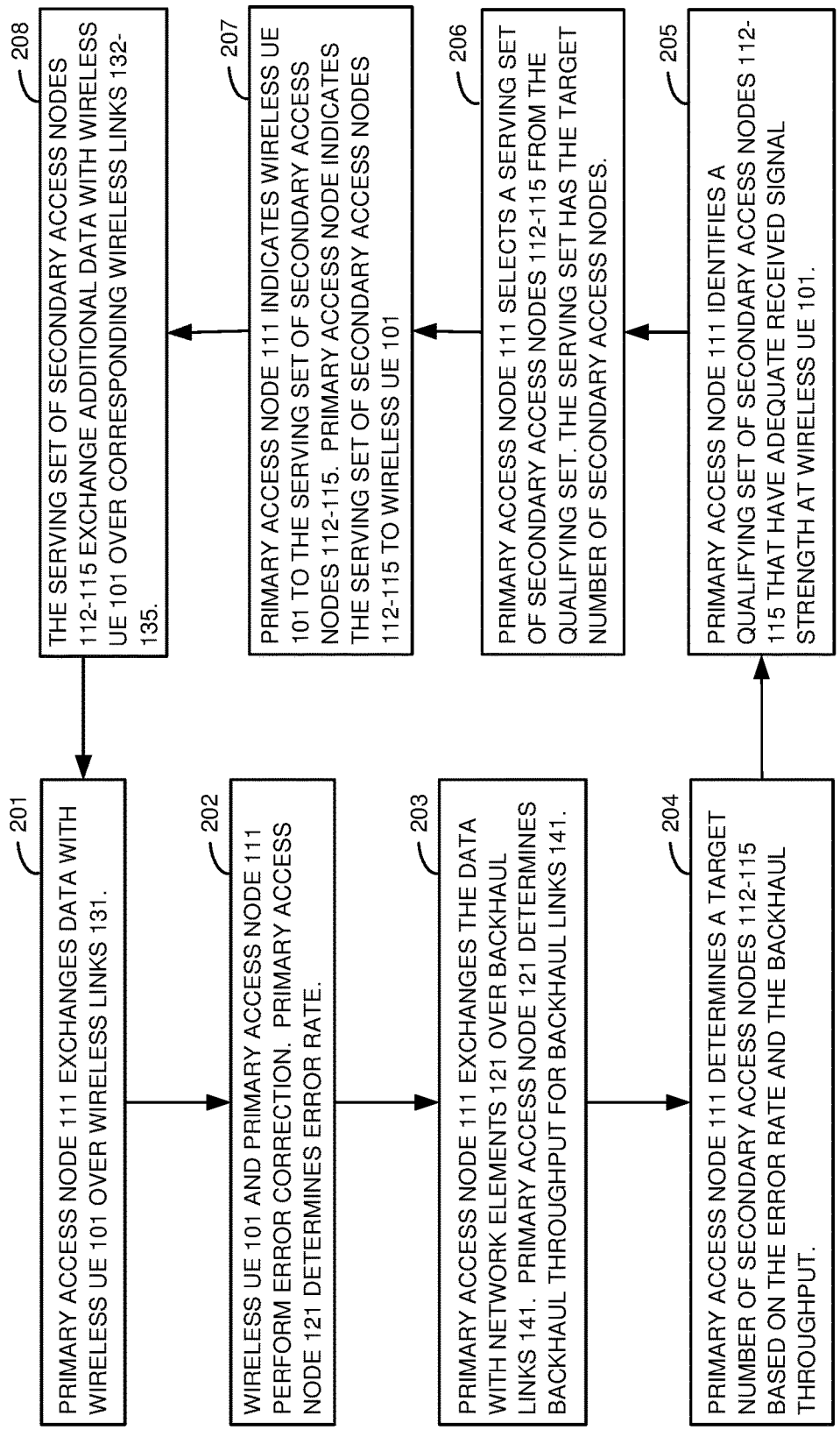
FIG. 2 illustrates the operation of the wireless communication network comprising the primary access node that controls the amount of the secondary access nodes that serve the wireless UE.

FIG. 2 illustrates the operation of wireless communication network 100 and primary access node 111 to control the amount of secondary access nodes 112-115 that serve wireless UE 101. Primary access node 111 exchanges data with UE 101 over wireless link 131 (201). UE 101 and primary access node 111 perform error correction on the data (202). Primary access node 111 determines an error rate for the error correction. Primary access node 111 exchanges the data with network elements 121 over backhaul links 141 and determines backhaul throughput for backhaul links 141 (203). Primary access node 111 determines a target number of secondary access nodes 112-115 based on the error rate and the backhaul throughput (204). Primary access node 111 identifies a qualifying set of secondary access nodes 112-115 that have adequate received signal strength at UE 101 (205). Primary access node 111 selects a serving set of secondary access nodes 112-115 where the serving set has the target number of secondary access nodes (206). Primary access node 111 indicates UE 101 to the serving set of secondary access nodes 112-115 and indicates the serving set of secondary access nodes 112-115 to UE 101 (207). The serving set of secondary access nodes 112-115 exchange data with UE 101 over corresponding wireless links 131-135 (208). The operation repeats (201).

Figure 3:
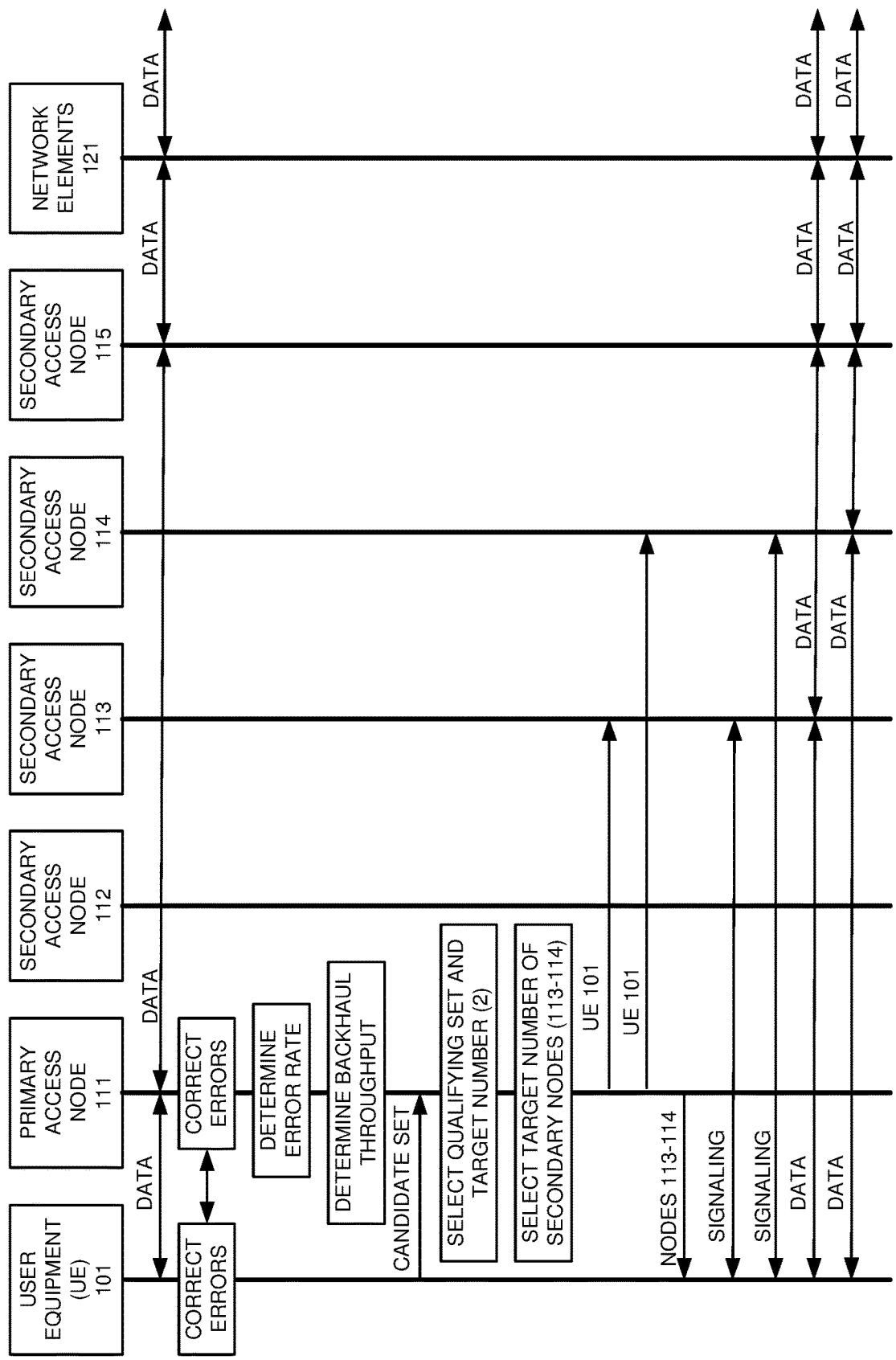
FIG. 3 illustrates the operation of the wireless communication network comprising the primary access node that controls the amount of the secondary access nodes that serve the wireless UE.

FIG. 3 illustrates the operation of wireless communication network 100 and primary access node 111 to control the amount of secondary access nodes 112-115 that serve wireless UE 101. UE 101 and primary access node 111 wirelessly exchange data. Primary access node 111 and network elements 121 exchange the data over backhaul links 141. Network elements 121 exchange the data with external systems. UE 101 and primary access node 111 perform error correction on the data. Primary access node 111 determines an error rate for the error correction. Primary access node 111 determines backhaul throughput for backhaul links 141. Primary access node 111 receives a candidate set from UE 101 that identifies secondary access nodes 112-115 and their received signal strengths. Primary access node 111 selects a qualifying set of secondary access nodes from the candidate set that have adequate received signal strength at UE 101. Primary access node 111 determines a target number based on the error rate and the backhaul throughput. The selected target number is two in this particular example. Primary access node 111 selects the target number of secondary access nodes from the qualifying set to form a serving set of secondary access nodes. Thus, the serving set has the target number of secondary access nodes. Primary access node 111 may sort the qualifying set by signal strength and select the target number of access nodes from the top of the list.

Primary access node 111 selects secondary access nodes 113-114 for the serving set in this example. Primary access node 111 transfers signaling that indicates UE 101 to the serving set of secondary access nodes 113-114. Primary access node 111 transfers signaling that indicates the serving set of secondary access nodes 113-114 to UE 101. UE 101 and the serving set of secondary access nodes 113-114 exchange data. The serving set of secondary access nodes 113-114 and network elements 121 exchange the data. Network elements 121 exchange some of the data with external systems.

Advantageously, primary access node 111 uses the error rate and the backhaul throughput to efficiently and effectively optimize the number of secondary access nodes 112-115 that serve UE 101.

Figure 4:
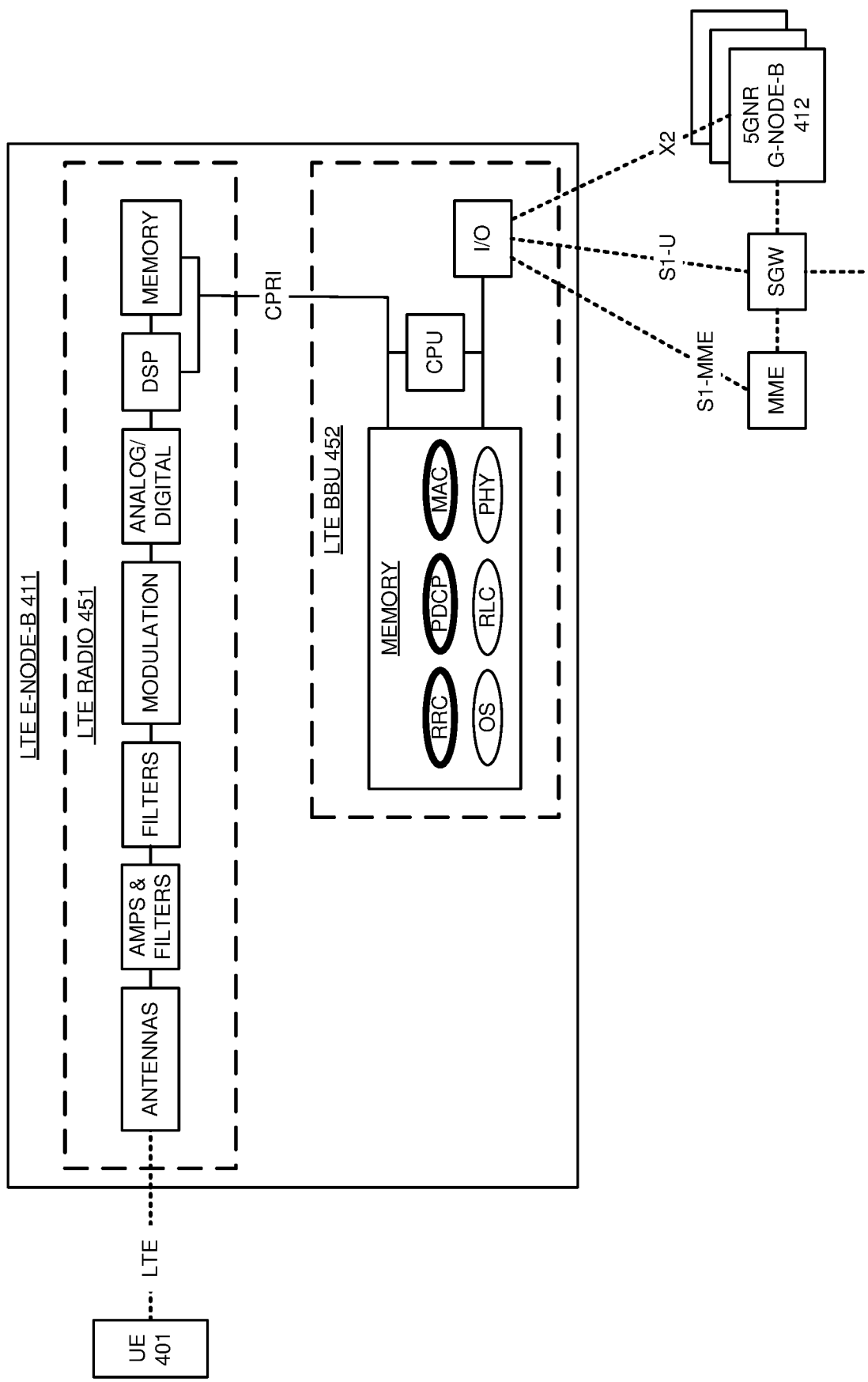
FIG. 4 illustrates a Long Term Evolution (LTE) eNodeB that controls the amount of Fifth Generation New Radio (5GNR) gNodeBs that serve a wireless UE.

FIG. 4 illustrates Long Term Evolution (LTE) eNodeB 411 that controls the amount of Fifth Generation New Radio (5GNR) gNodeBs that serve wireless UE 401. LTE eNodeB 411 is an example of primary access node 111, although access node 111 may differ. LTE eNodeB 411 comprises LTE radio 451 and LTE Baseband Unit (BBU) 452 that are coupled over a Common Public Radio Interface (CPRI) link. LTE radio 451 comprises antennas, amps, filters, modulation, analog-to-digital interfaces, DSP, and memory that are coupled over bus circuitry. LTE BBU 452 comprises memory, CPU, and data Input/Output (I/O) that are coupled over bus circuitry.

In LTE BBU 452, the memory stores operating systems (OS), Physical Layer (PHY), Media Access Control (MAC), Radio Link Control (RLC), Packet Data Convergence Protocol (PDCP), and Radio Resource Control (RRC). The CPU in BBU 452 executes the operating systems, PHY, MAC, RLC, PDCP, and RRC to drive the exchange of data between UE 401 and the SGW. The CPU in BBU 452 executes the operating systems, PHY, MAC, RLC, PDCP, and RRC to drive the exchange of LTE signaling between UE 401 and the MME. The CPU in BBU 452 executes the operating systems and RRC to drive the exchange of 5GNR signaling with the 5GNR gNodeBs that include gNodeB 412.

In LTE radio 451, the antennas receive wireless signals from UE 401 that transport uplink LTE signaling and uplink LTE data. The antennas transfer corresponding electrical uplink signals through duplexers and amps that boost the received uplink signals. The filters attenuate unwanted energy. Demodulators down-convert the uplink signals from their carrier frequencies. The analog/digital interfaces convert the analog uplink signals into digital uplink signals for the DSP. The DSP recovers uplink symbols from the uplink digital signals. The DSPs transfer the uplink symbols to LTE BBU 452 over the CPRI link. In LTE BBU 452, the CPU executes the network applications to process the uplink symbols and recover the uplink LTE data and uplink LTE signaling.

The network applications receive uplink 5GNR signaling from the 5GNR gNodeBs (including gNodeB 412) over the data I/O and X2 links. The network applications receive downlink S1-MME signaling from the MME over the data I/O and backhaul links. The network applications process the uplink LTE signaling, uplink 5GNR signaling, and downlink S1-MME signaling to generate new uplink S1-MME signaling, new downlink LTE signaling, and new downlink 5GNR signaling. The network applications transfer the new uplink S1-MME signaling to the MME over the data I/O and backhaul links. The network applications transfer the uplink LTE data to the SGW over the data I/O and S1-U links. The network applications transfer the new downlink 5GNR signaling to the 5GNR gNodeBs (including gNodeB 412) over the data I/O and X2 links.

The network applications receive new downlink LTE data from the SGW over the data I/O and S1-U links. The network applications process the new downlink S1-MME signaling and the new downlink LTE data to generate corresponding downlink symbols in the frequency domain. The network applications transfer the downlink symbols to LTE radio 451 over the CPRI link. In LTE radio 451, the DSP processes the downlink symbols to generate corresponding digital signals for the analog-to-digital interfaces. The analog-to-digital interfaces convert the digital downlink signals into analog downlink signals for modulation. Modulation up-converts the downlink signals to their carrier frequencies. The filters attenuate unwanted out-of-band energy and transfer the filtered downlink signals through duplexers to amps which boost the filtered downlink signals. The electrical downlink signals drive the antenna to emit corresponding wireless signals that transport the downlink LTE signaling and downlink LTE data to UE 401.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 401 and the network applications (PHY, MAC, RLC, PDCP, RRC) exchange wireless LTE data and signaling over LTE radio 451 and the LTE links. The PDCP and the SGW exchange the LTE data over the S1-U links. The PDCP determines downlink throughput for the S1-U links in average bytes per second. The PDCP reports the downlink S1-U throughput to the RRC.

UE 401 and the MAC in LTE eNodeB 411 perform HARQ on the LTE data and signaling. On the uplinks, the MAC checks parity bits for accuracy and acknowledges accurately-received data blocks to UE 401. On the uplinks, the MAC checks sequence numbers for order and requests the retransmission of missing data blocks from UE 401. On the downlinks, the MAC adds parity bits to the data blocks and retransmits data blocks that are not acknowledged by UE 401. On the downlinks, the MAC adds sequence numbers and retransmits missing data upon request from UE 401. The MAC may not retransmit small amounts of lost data, although other layers like Transmission Control Protocol (TCP) may perform the retransmissions. The MAC determines the downlink HARQ Block Error Rate (BLER). The downlink HARQ BLER is the percentage of lost/retransmitted downlink data blocks relative to the total amount of transmitted downlink data blocks. The MAC reports the downlink HARQ BLER to the RRC.

The RRC selects a target number of the gNodeBs to serve UE 401 based on the downlink LTE HARQ BLER for UE 401 and based on the downlink data throughput over the LTE S1-U links. The RRC hosts a data structure that translates HARQ BLER and downlink S1-U throughput into target number. The data structure increases the target number responsive to BLER decreases and S1-U throughput increases. The data structure decreases the target number responsive to BLER decreases and S1-U throughput increases. The RRC typically combines multiples increases and decreases to determine the target number based on changes to HARQ BLER and S1-U throughput. For example, a default target number of three may be lowered to two based on a high error rate and then be raised back to three due to high backhaul throughput.

The RRC broadcasts a list of frequencies for the 5GNR gNodeBs (including gNodeB 412) over the LTE links. UE 401 receives and scans the list to detect the received signal strengths of the 5GNR gNodeBs (including gNodeB 412). UE 401 reports the detected gNodeBs and their received signal strengths to the RRC. The gNodeBs reported by UE 401 are referred to the candidate set. The RRC selects a qualifying set of the 5GNR gNodeBs from the candidate set based on their received signal strengths. The RRC typically selects all of the 5GNR gNodeBs in the candidate set that have a signal strength at UE 401 which exceeds a qualifying threshold. The RRC selects a target number of 5GNR gNodeBs from the qualifying set to form a serving set. The RRC transfers signaling over the X2 links to direct the serving set of the 5GNR gNodeBs to serve UE 401. The RRC transfers signaling over the LTE links to direct UE 401 to attach to the serving set of the 5GNR gNodeBs.

Figure 5:
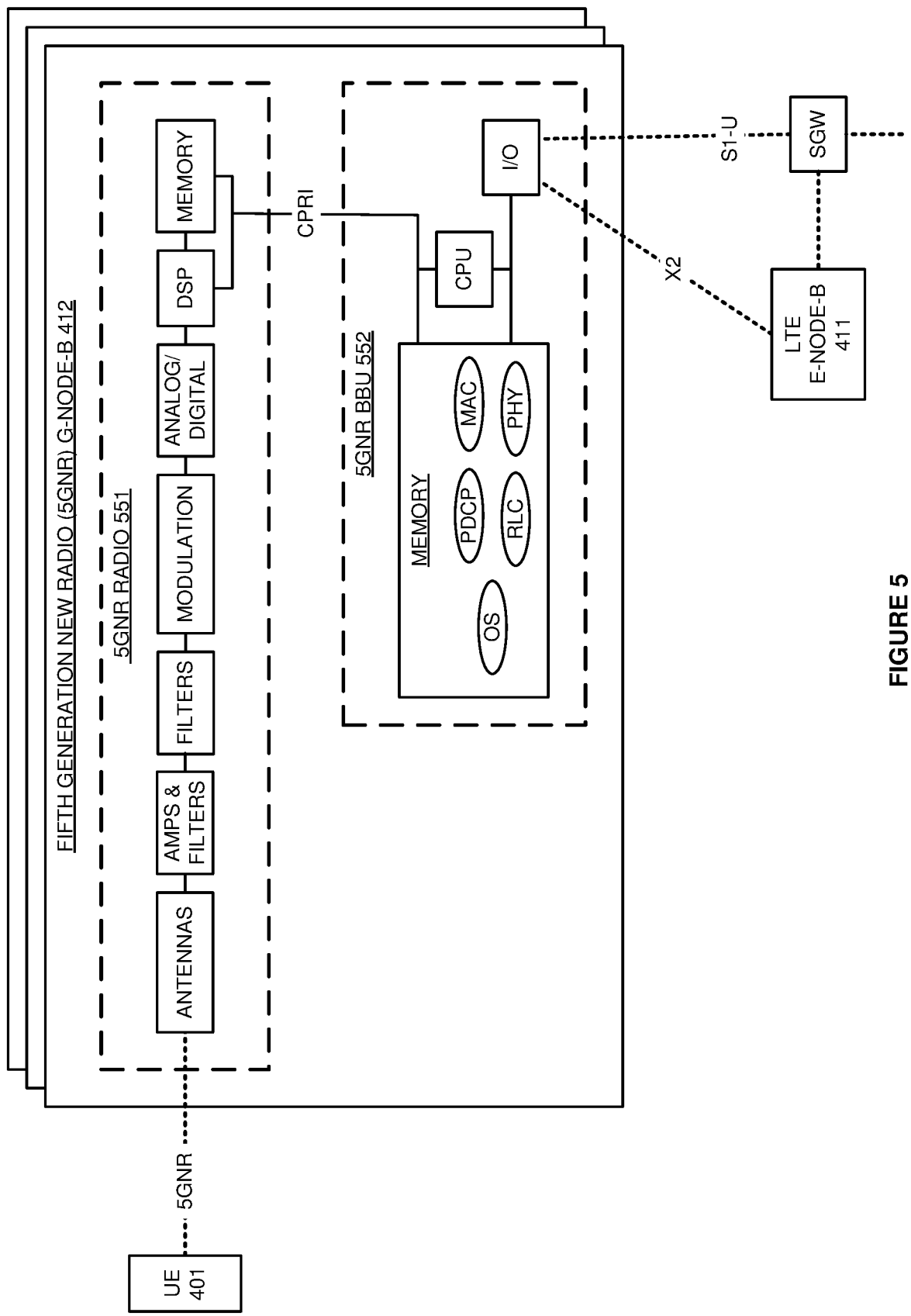
FIG. 5 illustrates the 5GNR gNodeBs that serve the wireless UE.

FIG. 5 illustrates 5GNR gNodeB 412 that serves wireless UE 401. 5GNR gNodeB 412 is an example of secondary access nodes 112-115, although access nodes 112-115 may differ. Additional 5GNR gNodeBs are depicted underneath gNodeB 412 and would be configured and operate in a similar manner. 5GNR gNodeB 412 comprises 5GNR radio 551 and 5GNR BBU 552 that are coupled over a CPRI link. 5GNR radio 551 comprises antennas, amps, filters, modulation, analog-to-digital interfaces, DSP, and memory that are coupled over bus circuitry. 5GNR BBU 552 comprises memory, CPU, and data I/O that are coupled over bus circuitry.

In 5GNR BBU 552, the memory stores operating systems, PHY, MAC, RLC, and PDCP. The CPU in BBU 552 executes the operating systems, PHY, MAC, RLC, and PDCP to drive the exchange of data between UE 401 and the SGW. The CPU in BBU 552 executes the operating systems, PHY, MAC, RLC, and PDCP to drive the exchange of 5GNR signaling with UE 401. The CPU in BBU 552 executes the operating systems, PHY, MAC, RLC, and PDCP to drive the exchange of 5GNR signaling with LTE eNodeB 411 over the X2 links.

In 5GNR radio 551 the antennas receives wireless signals from UE 401 that transport uplink 5GNR signaling and uplink 5GNR data. The antennas transfer corresponding electrical uplink signals through duplexers and amps that boost the received uplink signals. The filters attenuate unwanted energy. Demodulators down-convert the uplink signals from their carrier frequencies. The analog/digital interfaces convert the analog uplink signals into digital uplink signals for the DSP. The DSP recovers uplink symbols from the uplink digital signals. The DSPs transfer the uplink symbols to 5GNR BBU 552 over the CPRI link. In 5GNR BBU 552, the CPU executes the network applications to process the uplink symbols and recover the uplink 5GNR data and uplink 5GNR signaling. The network applications receive downlink 5GNR signaling from LTE eNodeB 411 over the X2 links. The network applications process the uplink 5GNR signaling and downlink 5GNR signaling to generate new uplink 5GNR signaling and new downlink 5GNR signaling. The network applications transfer the new uplink 5GNR signaling to LTE eNodeB 411 over the data I/O and X2 links. The network applications transfer the uplink 5GNR data to the SGW over the data I/O and S1-U links.

The network applications receive new downlink 5GNR data from the SGW over the data I/O and S1-U links. The network applications process the new downlink 5GNR signaling and the new downlink 5GNR data to generate corresponding downlink symbols in the frequency domain. The network applications transfer the downlink symbols to 5GNR radio 551 over the CPRI link. In 5GNR radio 551, the DSP processes the downlink symbols to generate corresponding digital signals for the analog-to-digital interfaces. The analog-to-digital interfaces convert the digital downlink signals into analog downlink signals for modulation. Modulation up-converts the downlink signals to their carrier frequencies. The filters attenuate unwanted out-of-band energy and transfer the filtered downlink signals through duplexers to amps which boost the filtered downlink signals. The electrical downlink signals drive the antenna to emit corresponding wireless signals that transport the downlink 5GNR signaling and downlink 5GNR data to UE 401.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The RRC in 5GNR gNodeB 412 (and the RRCs in the other gNodeBs) broadcast pilot signals over their radios and 5GNR links. UE 401 detects and reports the received signal strengths of the 5GNR gNodeBs to the RRC in LTE eNodeB 412. In this examples, 5GNR gNodeB 412 is in the serving set and the other gNodeBs in the serving set would operate in a like manner. The RRC in 5GNR gNodeB 412 receives 5GNR signaling from LTE eNodeB 411 over the X2 links that direct the gNodeB 412 to serve UE 401. The RRC in 5GNR gNodeB 412 exchanges signaling with UE 401 over 5GNR radio 551 and the 5GNR links. The PDCP in gNodeB 412 exchanges data with UE 401 over the 5GNR links. The PDCP in gNodeB 412 exchanges the data with the SGW over the S1-U links.

Figure 6:
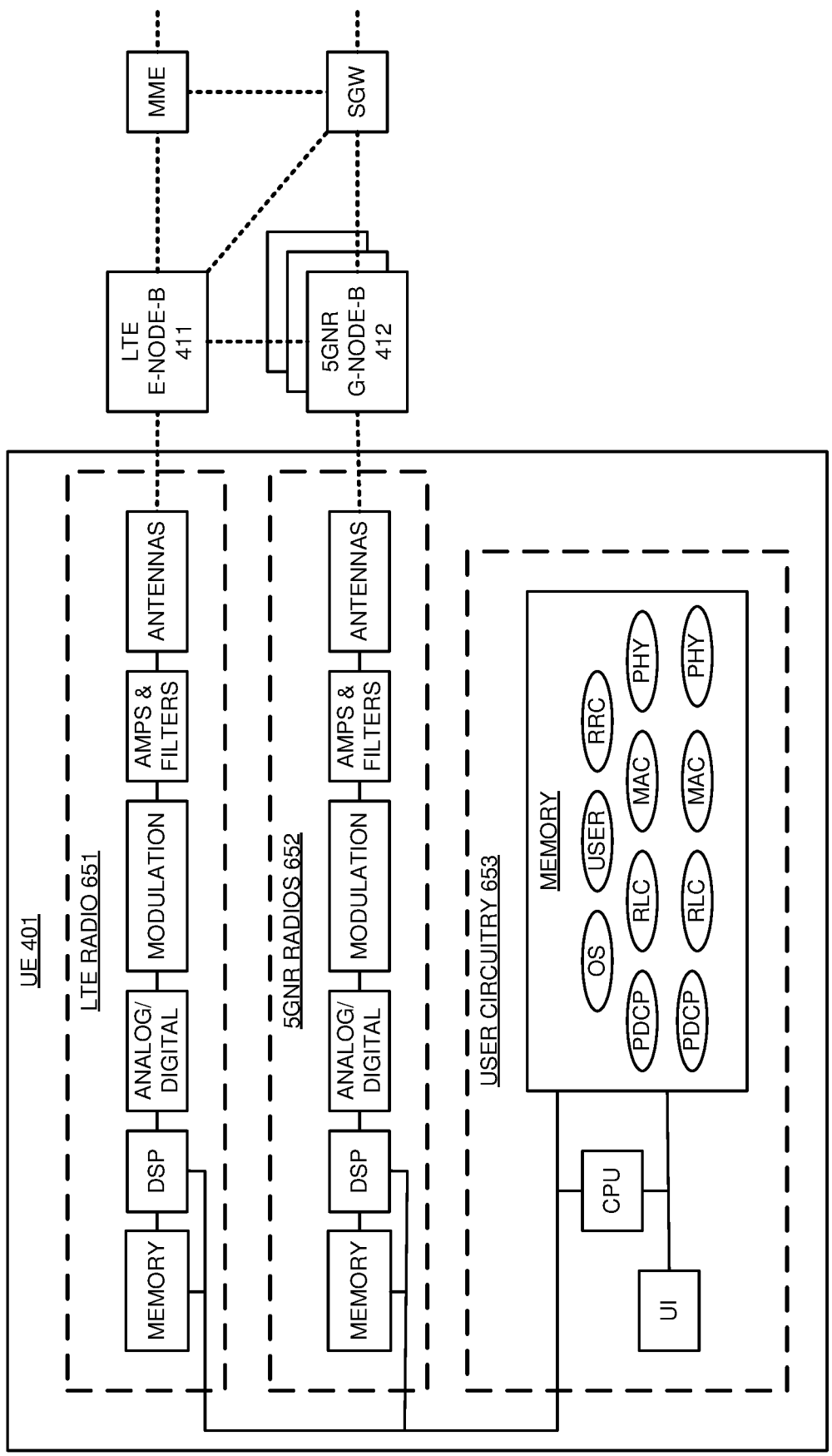
FIG. 6 illustrates the wireless UE that is served by the LTE eNodeB and the 5GNR gNodeBs.

FIG. 6 illustrates wireless UE 401 that is served by LTE eNodeB 411, 5GNR gNodeB 412, and the other 5GNR gNodeBs. UE 401 is an example of UE 101, although UE 101 may differ. UE 401 comprises LTE radio 651, 5GNR radios 652, and control circuitry 653 that are coupled over bus circuitry. Radios 651-652 comprises antennas, amps, filters, modulation, analog-to-digital interfaces, DSP, and memory that are coupled over bus circuitry. The antennas in radios 651-652 are wirelessly coupled to the antennas in LTE access node 411 and the 5GNR access nodes including 5GNR access node 412.

User circuitry 653 comprises user interfaces (UI), CPU, and memory. The memory in user circuitry 653 stores operating systems, user applications (USER), and network applications for 5GNR PHY, 5GNR MAC, 5GNR RLC, 5GNR PDCP, LTE PHY, LTE MAC, LTE RLC, LTE PDCP, and LTE RRC. The CPU executes the operating systems, user applications, and network applications to exchange signaling and data between the user applications and the network applications. The CPU executes the operating systems and network applications to wirelessly exchange corresponding LTE signaling and LTE data with LTE eNodeB 411 over LTE radio 651. The CPU executes the operating systems and network applications to wirelessly exchange corresponding 5GNR signaling and 5GNR data with the 5GNR gNodeB s including 5GNR gNodeB 412 over 5GNR radios 652.

In LTE radio 651, the antennas receive wireless signals from LTE eNodeB 411 that transport downlink LTE signaling and downlink LTE data. The antennas transfer corresponding electrical downlink signals through duplexers to the amps. The amps boost the received downlink signals for filters which attenuate unwanted energy. In modulation, demodulators down-convert the downlink signals from their carrier frequencies. The analog/digital interfaces convert the analog downlink signals into digital downlink signals for the DSP. The DSP recovers downlink symbols from the downlink digital signals. The CPU executes the network applications to process the downlink symbols and recover the downlink LTE signaling and downlink LTE data. The network applications transfer the corresponding downlink data to the user applications over the operating systems.

The network applications receive uplink user signaling and data from the operating systems for the user applications. The network applications process the uplink user signaling and downlink LTE signaling to generate new downlink user signaling and new uplink LTE signaling. The network applications exchange 5GNR signaling with the 5GNR PDCP. The network applications transfer new downlink user signaling and data to the operating systems for delivery to the user applications. The network applications process the new uplink LTE signaling and uplink user data to generate corresponding uplink symbols. The DSP processes the uplink symbols to generate corresponding digital signals for the analog-to-digital interfaces. The DSP also processes the power control instructions from the MAC to direct the amps. The analog-to-digital interfaces convert the digital uplink signals into analog uplink signals for modulation. Modulation up-converts the uplink signals to their carrier frequencies. The filters attenuate unwanted out-of-band energy and transfer the filtered uplink signals through the amps to the antennas. The amps boost the modulated uplink signals. The electrical uplink signals drive the antennas to emit corresponding wireless signals that transport the new uplink LTE signaling and new uplink LTE data to LTE eNodeB 411.

In 5GNR radios 652, the antennas receive wireless signals from 5GNR gNodeB 412 that transport downlink 5GNR signaling and downlink 5GNR data. The antennas transfer corresponding electrical downlink signals through duplexers to the amps. The amps boost the received downlink signals for filters which attenuate unwanted energy. In modulation, demodulators down-convert the downlink signals from their carrier frequencies. The analog/digital interfaces convert the analog downlink signals into digital downlink signals for the DSP. The DSP recovers downlink symbols from the downlink digital signals. The CPU executes the network applications to process the downlink symbols and recover the downlink 5GNR signaling and downlink 5GNR data. The network applications transfer the corresponding downlink data to the user applications over the operating systems.

The network applications receive uplink user signaling and data from the operating systems for the user applications. The network applications exchange 5GNR signaling with the LTE RRC. The network applications process the uplink user signaling and downlink 5GNR signaling to generate new downlink user signaling and new uplink 5GNR signaling. The network applications transfer new downlink user signaling and data to the operating systems for delivery to the user applications. The network applications process the new uplink 5GNR signaling and uplink user data to generate corresponding uplink symbols. The DSP processes the uplink symbols to generate corresponding digital signals for the analog-to-digital interfaces. The DSP also processes the power control instructions from the MAC to direct the amps. The analog-to-digital interfaces convert the digital uplink signals into analog uplink signals for modulation. Modulation up-converts the uplink signals to their carrier frequencies. The filters attenuate unwanted out-of-band energy and transfer the filtered uplink signals through the amps to the antennas. The amps boost the modulated uplink signals. The electrical uplink signals drive the antennas to emit corresponding wireless signals that transport the new uplink 5GNR signaling and new uplink 5GNR data to the 5GNR gNodeBs including gNodeB 412.

RRC functions comprise authentication, security, handover control, status reporting, QoS, network broadcasts and pages, and network selection. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/ removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The LTE PDCPs in UE 401 and LTE eNodeB 411 exchange data over the LTE radio 651 and the LTE links. The LTE MAC in UE 401 performs HARQ on the data as described above for the MAC in NodeBs 411-412. The LTE RRC receives signaling from LTE eNodeB 411 that indicates frequencies for the 5GNR gNodeBs including gNodeB 412. The LTE RRC directs the LTE PHY to scan the frequencies. The LTE PHY scans the frequencies and determines the received signal strengths for the 5GNR gNodeBs including gNodeB 412. The LTE PHY reports the received signal strength to the LTE MAC which reports to the LTE RRC. The LTE RRC in UE 401 receives signaling from LTE eNodeB 411 over the LTE links and LTE radio 651 that indicates a selected set of the 5GNR gNodeBs that may include gNodeB 412. In UE 401, the LTE RRC directs the 5GNR PDCPs that correspond to the serving set of the 5GNR gNodeBs to attach to their corresponding gNodeBs. The PDCPs exchange 5GNR signaling and data with the serving set of the 5GNR gNodeBs over 5GNR radios 652 and the 5GNR links.

Figure 7:
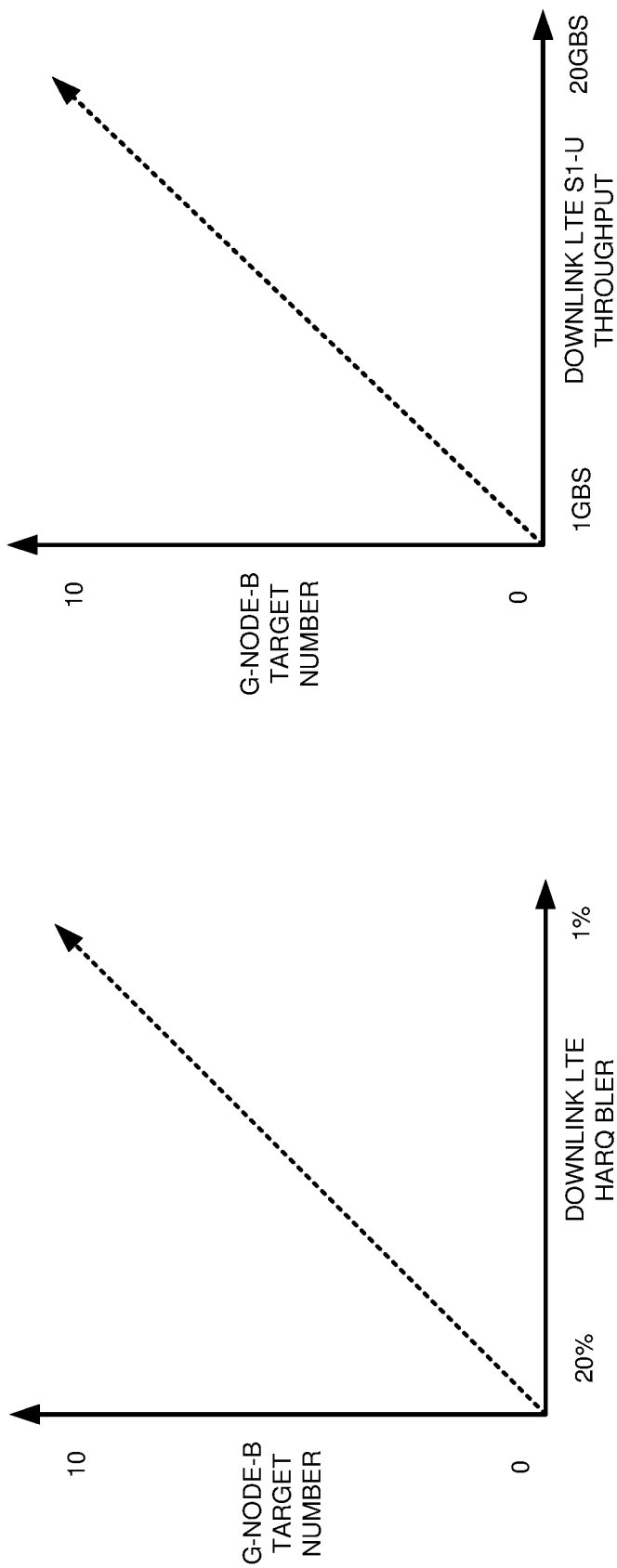
FIG. 7 illustrates the operation of the LTE eNodeB to control the amount of 5GNR gNodeBs that serve the wireless UE.

FIG. 7 illustrates the operation of LTE eNodeB 411 to control the amount of 5GNR gNodeBs that serve wireless UE 401. FIG. 7 depicts two graphs. On the left graph, the vertical axis represents the target number of gNodeBs from 0-10 and the horizontal axis represents the downlink LTE HARQ BLER from 1%-20%. On the right graph, the vertical axis represents the target number of gNodeBs from 0-10 and the horizontal axis represents the downlink LTE S1-U throughput from 1 Gigabit Per Second (GPS) to 20 GPS. The numbers on the graphs are illustrative and could be different in other examples.

The graphs are reduced to corresponding data structures in LTE eNodeB 411. The LTE RRC in eNodeB 411 enters the data structures with the downlink HARQ BLER and the downlink LTE S1-U throughput to yield two target numbers from the data structures. The LTE RRC averages the two target numbers and rounds the average to the nearest integer which comprises the selected target number of the gNodeBs that will serve UE 401. The target number tends upward as downlink HARQ BLER decreases or the downlink S1-U throughput increases. The target number tends downward as the downlink HARQ BLER increases or the downlink S1-U throughput decreases.

Figure 8:
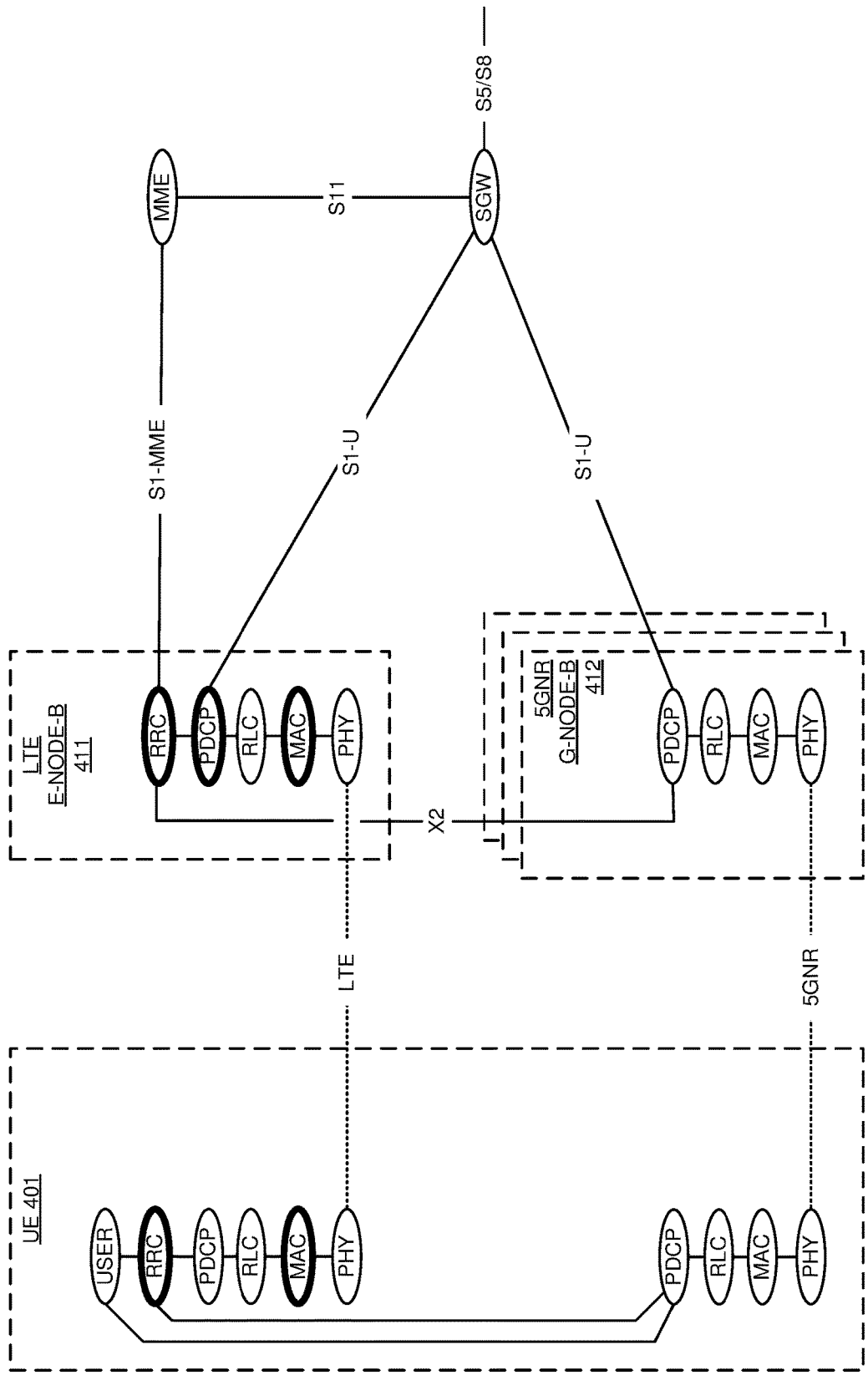
FIG. 8 illustrates a the operation of the LTE eNodeB, the 5GNR gNodeBs, and the wireless UE.

FIG. 8 illustrates the operation of LTE eNodeB 411, 5GNR gNodeB 412, and wireless UE 401. The operation of the other 5GNR gNodeBs would be similar to 5GNR gNodeB 412. The LTE RRCs in UE 401 and LTE eNodeB 411 exchange LTE signaling over their PDCPs, RLCs, MACs, and PHYs. The RRC in LTE eNodeB 411 and the MME exchange S1-MME signaling. The MME and the SGW exchange S11 signaling. In response to the signaling, the user applications in UE 401 exchange data with the LTE PDCP in UE 401. The LTE PDCP in UE 411 exchanges the data with the PDCP in LTE eNodeB 411 over their RLCs, MACs, and PHYs. The PDCP in LTE eNodeB 411 exchanges the data with the SGW over the S1-U links. The SGW exchanges the data with other systems over the S5/S8 links.

The PDCP in LTE eNodeB 411 determines the downlink throughput over the S1-U links in average bytes per second. The PDCP in LTE eNodeB 411 reports the downlink S1-U throughput to the RRC in LTE eNodeB 411. The LTE MAC in UE 401 and the MAC in LTE eNodeB 411 perform HARQ on the LTE data and signaling. The MAC in LTE eNodeB 411 determines the downlink HARQ BLER. The MAC in LTE eNodeB 411 reports the downlink HARQ BLER to the RRC in LTE eNodeB 411.

The RRC in LTE eNodeB 411 selects a target number of the gNodeBs to serve UE 401 based on the downlink HARQ BLER for UE 401 and based on the downlink S1-U throughput to eNodeB 411. The RRC in LTE eNodeB 411 broadcasts a list of frequencies for the 5GNR gNodeBs over the LTE PDCP, RLC, MAC, and PHY. The LTE RRC in UE 401 receives the frequency list over its LTE PDCP, RLC, MAC, and PHY. The RRC in UE 401 scans the frequencies over its 5GNR PDCPs, RLCs, MACs, and PHYs to detect the received signal strengths of the 5GNR gNodeBs including gNodeB 412. The RRC in UE 401 reports the candidate set of gNodeBs and their received signal strengths to the RRC in LTE eNodeB 411 over their PDCPs, RLCs, MACs, and PHYs. The RRC in eNodeB 411 selects a qualifying set of the 5GNR gNodeBs from the candidate set based on which received signal strengths exceed a qualifying threshold. The RRC selects the target number of 5GNR gNodeBs from the qualifying set to form a serving set based on received signal strength at UE 401.

In this specific example, the target number is one and 5GNR gNodeB 412 is selected. The RRC in eNodeB 411 transfers signaling over the X2 links that directs the PDCP in 5GNR gNodeB 412 to serve UE 401. The RRC also transfers signaling to the LTE RRC in UE 401 over the PDCPs, RLCs, MACs, and PHYs that directs the RRC to attach UE 401 to 5GNR gNodeB 412. In UE 401, the LTE RRC signals the 5GNR PDCP to attach to the PDCP in 5GNR gNodeB 412. The 5GNR PDCP in UE 401 wirelessly attaches to the PDCP in 5GNR gNodeB 412 over their 5GNR RLCs, MACs, and PHYs. In UE 401, the user applications exchange data with the 5GNR PDCP. The 5GNR PDCP in UE 401 exchanges the data with the PDCP in 5GNR gNodeB 412 over their 5GNR RLCs, MACs, and PHYs. The 5GNR PDCP in 5GNR gNodeB 412 exchanges the data with the SGW over the S1-U links. The SGW exchanges the data with other systems over the S5/S8 links.

The wireless data network circuitry described above comprises computer hardware and software that form special-purpose primary access node circuitry to control the amount of secondary access nodes that serve a wireless UE. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose primary access node circuitry to control the amount of secondary access nodes that serve a wireless UE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to control an amount of secondary access nodes that serve a wireless User Equipment (UE), the method comprising:
   a primary access node exchanging data with the wireless UE over one or more wireless links, performing error correction for the data, and determining an error rate for the error correction;
   the primary access node exchanging the data with at least one network element over one or more backhaul links and determining backhaul throughput for the one or more backhaul links;
   the primary access node determining a target number of the secondary access nodes based on the error rate and the backhaul throughput;
   the primary access node identifying a qualifying set of the secondary access nodes that have adequate received signal strength at the wireless UE;
   the primary access node selecting a serving set of the secondary access nodes from the qualifying set, wherein the serving set has the target number of the secondary access nodes;
   the primary access node indicating the wireless UE to the serving set of the secondary access nodes and indicating the serving set of the secondary access nodes to the wireless UE; and
   the serving set of the secondary access nodes exchanging additional data with the wireless UE over additional wireless links.

2. The method of claim 1 wherein the primary access node determining the target number comprises increasing the target number responsive to at least one of an error rate decrease and a backhaul throughput increase.

3. The method of claim 1 wherein the primary access node determining the target number comprises decreasing the target number responsive to at least one of an error rate increase and a backhaul throughput decrease.

4. The method of claim 1 wherein:
   the primary access node determining the target number comprises combining a numeric increase and a numeric decrease;
   the numeric increase is responsive to at least one of an error rate decrease and a backhaul throughput increase; and
   the numeric decrease is responsive to at least one of an error rate increase and a backhaul throughput decrease.

5. The method of claim 1 wherein the primary access node identifying the qualifying set of the secondary access nodes comprises:
   wirelessly receiving a report from the wireless UE that indicates a candidate set of the secondary access nodes and the individual received signal strengths for the candidate set; and
   the primary access node selecting the qualifying set of the secondary access nodes from the candidate set based on the individual received signal strengths.

6. The method of claim 1 wherein the primary access node performing the error correction comprises performing Hybrid Automatic Repeat Request (HARQ).

7. The method of claim 1 wherein the primary access node determining the error rate comprises determining Hybrid Automatic Repeat Request (HARQ) Block Error Rate (BLER).

8. The method of claim 1 wherein the primary access node determining the backhaul throughput comprises determining average bit rate for one more downlinks in the one or more backhaul links.

9. The method of claim 1 wherein the primary access node comprises a Long Term Evolution (LTE) eNodeB.

10. The method of claim 1 wherein the secondary access nodes comprise Fifth Generation New Radio (5GNR) gNodeBs.

11. A wireless communication network to control an amount of secondary access nodes that serve a wireless User Equipment (UE), the wireless communication network comprising:
   a primary access node configured to exchange data with the wireless UE over one or more wireless links, perform error correction for the data, and determine an error rate for the error correction;
   the primary access node configured to exchange the data with at least one network element over one or more backhaul links and determine backhaul throughput for the one or more backhaul links;
   the primary access node configured to determine a target number of the secondary access nodes based on the error rate and the backhaul throughput;
   the primary access node configured to identify a qualifying set of the secondary access nodes that have adequate received signal strength at the wireless UE;
   the primary access node configured to select a serving set of the secondary access nodes from the qualifying set, wherein the serving set has the target number of the secondary access nodes;
   the primary access node configured to indicate the wireless UE to the serving set of the secondary access nodes and indicate the serving set of the secondary access nodes to the wireless UE; and
   the serving set of the secondary access nodes configured to exchange additional data with the wireless UE over additional wireless links.

12. The wireless communication network of claim 11 wherein the primary access node is configured to increase the target number responsive to at least one of an error rate decrease and a backhaul throughput increase.

13. The wireless communication network of claim 11 wherein the primary access node is configured to decrease the target number responsive to at least one of an error rate increase and a backhaul throughput decrease.

14. The wireless communication network of claim 11 wherein:
- the primary access node is configured to combine a numeric increase and a numeric decrease to determine the target number;
- the numeric increase is responsive to at least one of an error rate decrease and a backhaul throughput increase; and
- the numeric decrease is responsive to at least one of an error rate increase and a backhaul throughput decrease.

15. The wireless communication network of claim 11 wherein the primary access node is configured to:
- wirelessly receive a report from the wireless UE that indicates a candidate set of the secondary access nodes and the individual received signal strengths for the candidate set; and
- select the qualifying set of the secondary access nodes from the candidate set based on the individual received signal strengths.

16. The wireless communication network of claim 11 wherein the error correction comprises Hybrid Automatic Repeat Request (HARQ).

17. The wireless communication network of claim 11 wherein the error rate comprises Hybrid Automatic Repeat Request (HARQ) Block Error Rate (BLER).

18. The wireless communication network of claim 11 wherein the primary access node is configured to determine average bit rate for one more downlinks in the one or more backhaul links.

19. The wireless communication network of claim 11 wherein the primary access node comprises a Long Term Evolution (LTE) eNodeB.

20. The wireless communication network of claim 11 wherein the secondary access nodes comprise Fifth Generation New Radio (5GNR) gNodeBs.

\* \* \* \* \*